(12) United States Patent
Hernacki et al.

(10) Patent No.: US 8,151,193 B2
(45) Date of Patent: Apr. 3, 2012

(54) PROVIDING IMAGE-BASED GUIDANCE FOR REMOTE ASSISTANCE

(75) Inventors: Brian Hernacki, Mountain View, CA (US); Sourabh Satish, Fremont, CA (US); Timothy G. Brown, Fort Edward, NY (US)

(73) Assignee: Symantec Corporation, Mountain View, CA (US)

( * ) Notice: Subject to any disclaimer, the term of this patent is extended or adjusted under 35 U.S.C. 154(b) by 1129 days.

(21) Appl. No.: 11/963,694

(22) Filed: Dec. 21, 2007

(65) Prior Publication Data

US 2009/0164899 A1     Jun. 25, 2009

(51) Int. Cl.
*G06F 3/00* (2006.01)

(52) U.S. Cl. .................. 715/709; 715/705; 715/751

(58) Field of Classification Search .................. 715/709, 715/705, 751, 753, 861; 709/219–223
See application file for complete search history.

(56) References Cited

U.S. PATENT DOCUMENTS

| | | | |
|---|---|---|---|
| 6,061,717 A | 5/2000 | Carleton et al. | |
| 6,144,991 A * | 11/2000 | England | 715/733 |
| 6,658,466 B1 | 12/2003 | Ellestad et al. | |
| 6,973,482 B2 | 12/2005 | Mohammed et al. | |
| 2002/0087949 A1 | 7/2002 | Golender et al. | |
| 2003/0001875 A1 | 1/2003 | Black et al. | |
| 2004/0260704 A1 | 12/2004 | Moore | |
| 2005/0268234 A1 | 12/2005 | Rossi, Jr. et al. | |
| 2007/0038945 A1 * | 2/2007 | Miller et al. | 715/760 |
| 2007/0177013 A1 * | 8/2007 | Shingu | 348/143 |
| 2008/0005283 A1 * | 1/2008 | Shingu | 709/219 |
| 2008/0270266 A1 * | 10/2008 | Keane | 705/27 |

OTHER PUBLICATIONS

PCT International Search Report for Application PCT/US2008/087780 dated Feb. 17, 2009.
Extended European Search Report for Counterpart European Application No. 08864518.9 dated Nov. 12, 2010.

* cited by examiner

*Primary Examiner* — Tuyetlien Tran
*Assistant Examiner* — Truc Chuong
(74) *Attorney, Agent, or Firm* — Brill Law Office; Jeffrey Brill

(57) ABSTRACT

Visual images of computer components are provided to remotely guide users through the process of setting up physical connections. Component identifying information is automatically gleaned and provided from a user's computer to a remote administrator. The administrator provides visual images of the components to the user, and remotely annotates them to guide the user through the configuration process. Image annotation can include pointing to a specific section of the image (e.g., the plug into which a cable is to be inserted) and/or drawing or writing on or otherwise marking-up the image to direct the user's attention. The visual image-based guidance can be supplemented by voice communication with the user.

20 Claims, 3 Drawing Sheets

PROVIDING IMAGE-BASED GUIDANCE FOR REMOTE ASSISTANCE

TECHNICAL FIELD

This invention pertains generally to providing remote computing assistance, and more specifically to providing image-based guidance for remote component configuration assistance.

BACKGROUND

The use of personal computers is extremely widespread today. Yet, many users are not proficient with computer configuration and setup. Many such users need assistance installing new hardware components, or configuring and managing their existing system. Although a more sophisticated user can often easily provide assistance if physically present, the realities of geographical dispersion and time management often require that technical help be provided remotely, for example over the telephone, internet or by email.

It is common to give a remote administrator access to a computer system, so that the remote administrator can aid the local user by performing tasks and services such as set-up, configuration and trouble shooting. Typically, a remote administrator logs-in to the local computer over a network, and has administrator level access to the user's computer while logged-in. Commercial software exists today that supports this type of remote administration.

However, a remote administrator is not present at the user site, and thus cannot connect cables, plug-in printers, and otherwise physically configure components for the user. Voice or email guidance directing users through the physical configuration of computer components is often too vague or unfamiliar to the user. For example, instructing a user to "plug that end of the cable into the USB port" does not help a user who does not know what a USB port is. For example, consider an experienced computer expert trying to help his/her mother (over the telephone) to connect her printer to her PC. The conversation would typically sound something like this:

Expert: "Okay, now connect your printer to the USB port on your computer with the USB device cable."
Mom: "Connect the what to the what with the what?"
Expert: "So, look on the printer and find a little sort-of square looking opening. It's probably on the back."
Mom: "I think I found it. Now what do I do?"
Expert: "Plug in the cable."
Mom: "Which cable? I have several."
And so on.

It would be desirable to be able to remotely guide users through computer component configuration in a more effective manner.

SUMMARY

In a system that provides remote management and administration capability for home computing, visual images of computer components are provided to remotely guide users through the process of setting up physical connections. Component identifying information is automatically gleaned and provided from a user's computer to a remote administrator. The administrator provides visual images of the components to the user, and remotely annotates them to guide the user through the configuration process. Image annotation can include pointing to a specific section of the image (e.g., the plug into which a cable is to be inserted) and/or drawing or writing on or otherwise marking-up the image to direct the user's attention. The visual image-based guidance can be supplemented by voice communication with the user.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
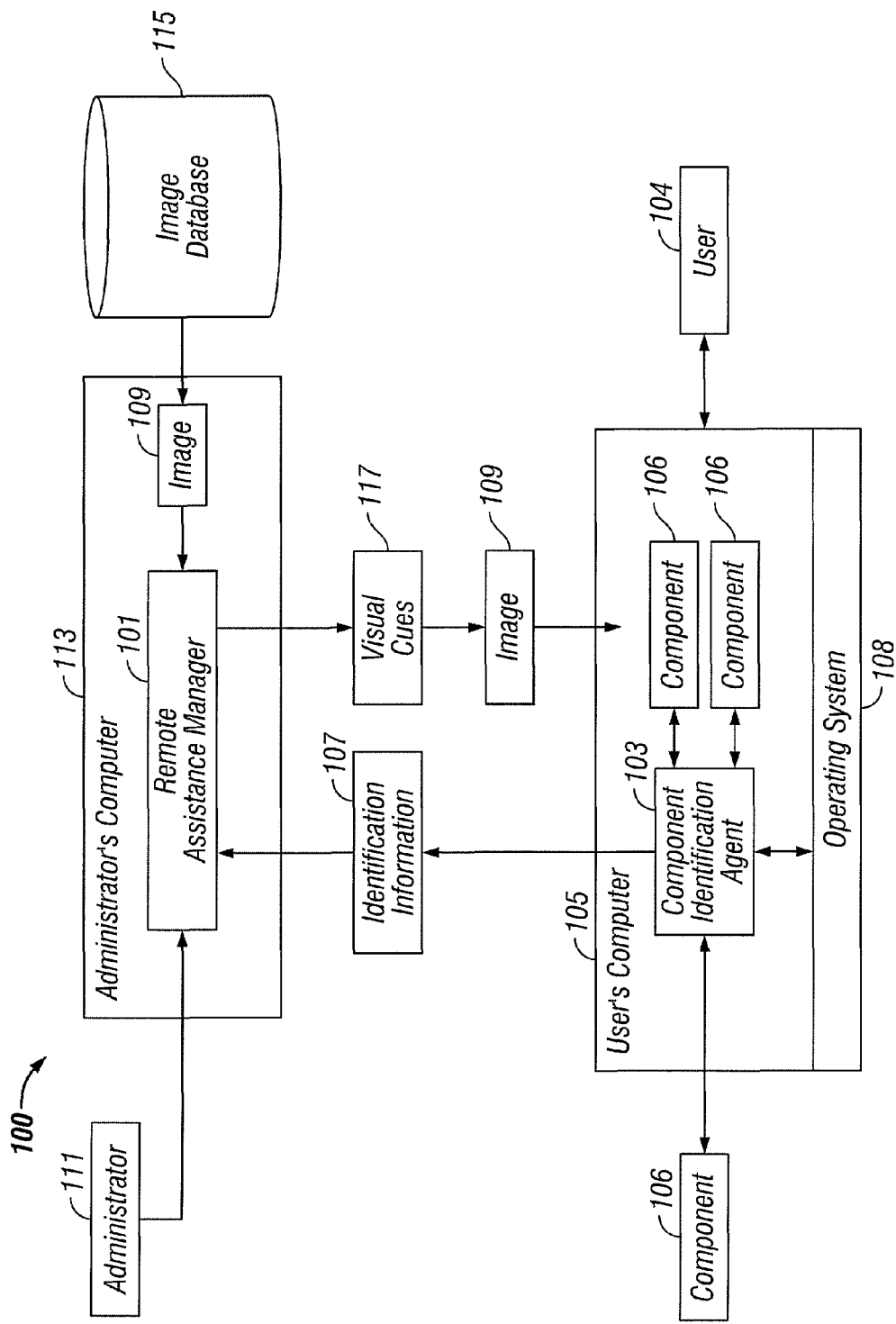
FIG. 1 is a block diagram illustrating a system in which a remote assistance manager enables robust remote computer component configuration assistance, according to some embodiments of the present invention.

FIG. 1 illustrates a system 100 in which a remote assistance manager 101 enables robust remote computer component configuration assistance within a remote management and administration context, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, a component identification agent 103 running on a user's 104 computer 105 strongly identifies (e.g., exact make and model number, etc.) the components 106 on the local system 105, and transmits component identification information 107 to the remote assistance manager 101. The component identification agent 103 can poll both the operating system 189 running on the user's 104 computer 105 and/or the components 106 themselves to obtain this information 107. The implementation mechanics of such polling operations is known to those of ordinary skill in the relevant art, and the usage thereof within the context of embodiments of the present invention will be readily apparent to those of such a skill level in light of this specification. In most instances, these polling operations will be sufficient to obtain component identification information 107. Other techniques for identifying difficult components 106 are discussed below.

The remote assistance manager 101 uses the component identification information 107 to retrieve images 109 of the components in question. The administrator 111 (e.g., the sophisticated party who is providing the technical help) can also select additional images 109 as desired. The remote assistance manager 101 can run, for example, on a central computer (not illustrated) or on the administrator's computer 113, as desired. In any case, the remote assistance manager 101 has access to a collection of images 109 of components 106, e.g., via the internet or a component image database 115, stored locally or remotely. The remote assistance manager 101 also has network connectivity access to the user's 104 computer 105, via. e.g., the internet, another type of wide area network, or a dedicated connection.

While the administrator 111 is in voice or electronic communication with the user 104 (e.g., via telephone, voice over internet, instant messaging, email, etc.), s/he can remotely push the images 109 to the user's 104 screen, along with visual cues 117. Thus, the administrator 111 can not only display images 109 of specific components 106 to the user 104, but can also point to specific areas and parts of the components 106, e.g., with a mouse pointer, and annotate the images 109 with a drawing tool or the like. Annotating the image 109 can include, for example, highlighting sections of the image, or drawing or writing on or otherwise marking-up the image 109 to direct the user's 104 attention. This provides much more tangible assistance to the user 104.

For example, using the system 100 illustrated in FIG. 1, the administrator 111 assisting his/her mom 104 with printer 106 installation could go like this:

Administrator: "Okay, look on your screen. See the picture of the cable? Find one like that."

Mom: "Okay, I've got it."

Administrator: "Now look on your screen, See the picture of your printer? See where I'm pointing with the arrow? Look there, and you'll see a jack that looks like this [image appears on screen showing the jack]. Plug the cable in there."

Mom: "Okay, I did that."

Administrator: "Okay, now see this picture of the back of your computer? See where I've drawn a circle around the picture of the plug? Plug the other end of the cable there."

Mom: "Okay."

Administrator: "Okay, see where the power button is? I'm pointing to it in the picture. Press that."

Mom: "Okay, now what?"

Administrator: "Okay, now I can handle the rest from here. Just give me a minute."

Mom: "Oh, you're the best son ever."

Administrator: "Just remember that at Christmas."

Figure 2:
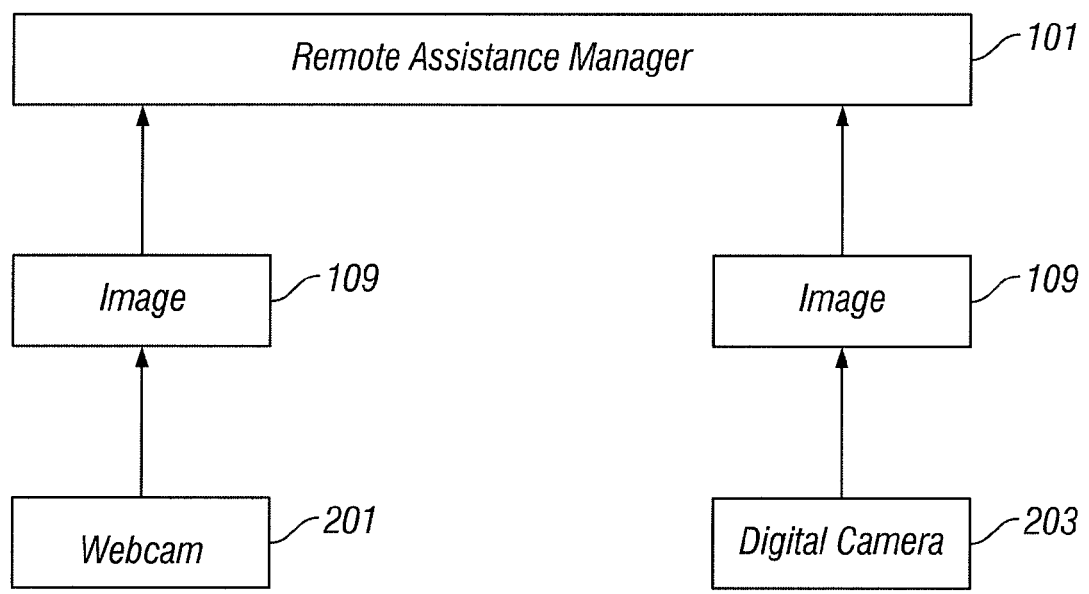
FIG. 2 is a block diagram illustrating using a webcam to identify components, according to another embodiment of the present invention.

Turning now to FIG. 2, where a given component 106 is difficult to identify, a webcam 201 can be used as a feedback interface. For example, suppose the component identification agent 103 running on the user's 104 computer 105 cannot obtain a positive identification of a user's scanner 106. The user 104 could point the web camera 201 at the device 106, and the resulting digital image 109 could be used by the administrator 111 for offering configuration help, or for selecting an image 109. In some cases, the webcam 201 could scan serial numbers or bar codes and the like, to provide strong identification information of components 106 that cannot otherwise be identified. Where a webcam 201 is not available, the user 104 could take a picture 109 with any digital camera 203, and that picture 109 could be used by the administrator 111.

Figure 3:
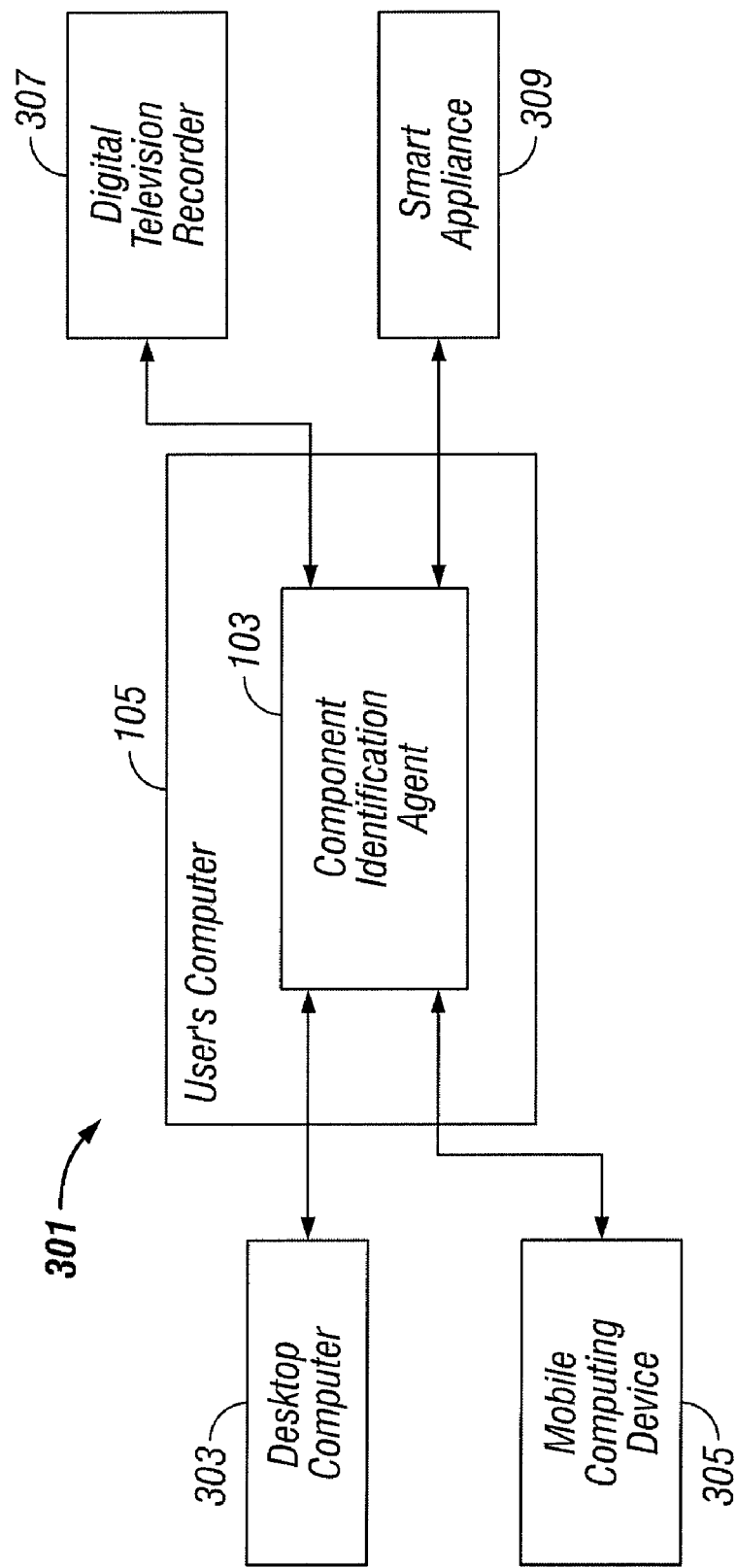
FIG. 3 is a block diagram illustrating a remote assistance manager providing remote configuration assistance for a plurality of components on a user's home network, according to some embodiment of the present invention.

Turning now to FIG. 3, it is to be understood that in some embodiments of the present invention, the component identification agent 103 running on the user's 104 computer 105 can identify not only computer peripherals 106 such as printers, display and audio devices, network connectivity devices, etc., but also any component 106 on the user's home network 301, such as other desktop computing devices 303, mobile computing devices 305, digital television recorders 307 (e.g., TIVO® devices), smart appliances 309, etc.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer implemented method for providing image-based guidance for remote assistance with electronic hardware component configuration, the method comprising the steps of:

receiving, by a remote computer, hardware component identification information, the hardware component identification information being automatically determined by a component identification agent and comprising metadata associated with at least one electronic hardware component of a user's computing system, to remotely assist the user with configuration of the at least one associated electronic hardware component;

wherein receiving hardware component identification information further comprises receiving hardware component identification information originating from the component identification agent, the component identification agent being in communication with the at least one electronic hardware component of the user's computing system, and the component identification agent polling the at least one electronic hardware component of the user's computing system or polling an operating system of the user's computing system;

responsive to a look-up according to the metadata, receiving, by the remote computer, at least one image associated with the at least one electronic hardware component;

transmitting, by the remote computer, the at least one image, to remotely assist a user with configuration of the at least one associated electronic hardware component; and providing, by the remote computer, at least one visual cue concerning the at least one image to the user, to further remotely assist the user with configuration of the at least one associated electronic hardware component.

2. The method of claim 1 wherein providing at least one visual cue concerning the at least one image to the user further comprises:

providing at least one visual cue from a group of visual cues consisting of:

a visual pointer to a section of the image;
a highlight of a section of the image;
a drawing on the image to direct the user's attention;
a marking on the image to direct the user's attention; and
writing on the image to direct the user's attention.

3. The method of claim 1 further comprising performing a step from a group of steps consisting of:

providing voice communication to the user, to further remotely assist the user with configuration of the at least one associated electronic hardware component;

providing electronic communication to the user, to further remotely assist the user with configuration of the at least one associated electronic hardware component.

4. The method of claim 1 wherein the at least one electronic hardware component associated with a user's computing system further comprises at least one electronic hardware component from a group of electronic hardware components consisting of:

a printer;
a scanner;
a display device;
an audio device;
a network device;
network hardware;
a webcam;
a digital camera;
a desktop computing device;
a mobile computing device;
a digital television recorder; and
a smart appliance.

5. The method of claim 1 wherein receiving hardware component identification information further comprises:

receiving at least one digital image of at least one hardware component.

6. The method of claim 1 wherein receiving hardware component identification information further comprises receiving hardware component identification information originating from at least one source from a group of sources consisting of:

a component identification agent that scans a serial number of the at least one electronic hardware component.

7. The method of claim 1 wherein transmitting at least one image associated with at least one electronic hardware component associated with the user's computing system to the user further comprises:

retrieving at least one image associated with at least one electronic hardware component associated with the user's computing system; and transmitting the at least one retrieved image to the user.

8. At least one non-transitory computer readable medium storing a computer program product for providing image-based guidance for remote assistance with electronic hardware component configuration, the computer program product comprising program code for:

receiving, by a remote computer, hardware component identification information, the hardware component identification information being automatically determined by a component identification agent and comprising metadata associated with at least one electronic hardware component of a user's computing system, to remotely assist the user with configuration of the at least one associated electronic hardware component;

wherein receiving hardware component identification information further comprises receiving hardware component identification information originating from the component identification agent, the component identification agent being in communication with the at least one electronic hardware component of the user's computing system, and the component identification agent polling the at least one electronic hardware component of the user's computing system or polling an operating system of the user's computing system;

responsive to a look-up according to the metadata, receiving, by the remote computer, at least one image associated with the at least one electronic hardware component;

transmitting, by the remote computer, the at least one image, to remotely assist a user with configuration of the at least one associated electronic hardware component; and providing, by the remote computer, at least one visual cue concerning the at least one image to the user, to further remotely assist the user with configuration of the at least one associated electronic hardware component.

9. The non-transitory computer readable medium of claim 8 wherein the program code for providing at least one visual cue concerning the at least one image to the user further comprises:

program code for providing at least one visual cue from a group of visual cues consisting of:

a visual pointer to a section of the image;
a highlight of a section of the image;
a drawing on the image to direct the user's attention;
a marking on the image to direct the user's attention; and
writing on the image to direct the user's attention.

10. The non-transitory computer readable medium of claim 8 further comprising program code for performing at least one step from a group of steps consisting of:

providing voice communication to the user, to further remotely assist the user with configuration of the at least one associated electronic hardware component; and providing electronic communication to the user, to further remotely assist the user with configuration of the at least one associated electronic hardware component.

11. The non-transitory computer readable medium of claim 8 wherein the at least one electronic hardware component associated with a user's computing system further comprises at least one electronic hardware component from a group of electronic hardware components consisting of:

a printer;
a scanner;
a display device;
an audio device;
a network device;
network hardware;
a webcam;

a digital camera;
a desktop computing device;
a mobile computing device;
a digital television recorder; and
a smart appliance.

12. The non-transitory computer readable medium of claim 8 wherein the program code for receiving hardware component identification information further comprises:
   program code for receiving at least one digital image of at least one hardware component.

13. The non-transitory computer readable medium of claim 8 wherein the program code for receiving hardware component identification information further comprises program code for receiving hardware component identification information originating from at least one source from a group of sources consisting of:
   a component identification agent that scans a serial number of the at least one electronic hardware component.

14. The non-transitory computer readable medium of claim 8 wherein the program code for transmitting at least one image associated with at least one electronic hardware component associated with the user's computing system to the user further comprises:
   program code for retrieving at least one image associated with at least one electronic hardware component associated with the user's computing system; and
   program code for transmitting the at least one retrieved image to the user.

15. A computer system, at least partially implemented in hardware, for providing image-based guidance for remote assistance with electronic hardware component configuration, the computer system comprising a remote assistance manager configured for:
   receiving, by a remote computer, hardware component identification information, the hardware component identification information being automatically determined by a component identification agent and comprising metadata associated with at least one electronic hardware component of a user's computing system, to remotely assist the user with configuration of the at least one associated electronic hardware component;
   wherein receiving hardware component identification information further comprises receiving hardware component identification information originating from the component identification agent, the component identification agent being in communication with the at least one electronic hardware component of the user's computing system, and the component identification agent polling the at least one electronic hardware component of the user's computing system or polling an operating system of the user's computing system;
   responsive to a look-up according to the metadata, receiving, by the remote computer, at least one image associated with the at least one electronic hardware component;
   transmitting, by the remote computer, the at least one image, to remotely assist a user with configuration of the at least one associated electronic hardware component; and
   providing, by the remote computer, at least one visual cue concerning the at least one image to the user, to further remotely assist the user with configuration of the at least one associated electronic hardware component.

16. The computer system of claim 15 wherein the remote assistance manager provides at least one visual cue from a group of visual cues consisting of:
   a visual pointer to a section of the image;
   a highlight of a section of the image;
   a drawing on the image to direct the user's attention;
   a marking on the image to direct the user's attention; and
   writing on the image to direct the user's attention.

17. The computer system of claim 15 wherein the remote assistance manager further provides at least one of: voice communication to the user, to further remotely assist the user with configuration of the at least one associated electronic hardware component, and electronic communication to the user, to further remotely assist the user with configuration of the at least one associated electronic hardware component.

18. The computer system of claim 15 wherein the at least one electronic hardware component associated with a user's computing system further comprises at least one electronic hardware component from a group of electronic hardware components consisting of:
   a printer;
   a scanner;
   a display device;
   an audio device;
   a network device;
   network hardware;
   a webcam;
   a digital camera;
   a desktop computing device;
   a mobile computing device;
   a digital television recorder; and
   a smart appliance.

19. The computer system of claim 15 wherein the remote assistance manager receives at least one digital image of at least one hardware component.

20. The computer system of claim 15 wherein: the remote assistance manager retrieves at least one image associated with at least one electronic hardware component associated with the computing system, and the interface transmits the at least one retrieved image to the user.

* * * * *